United States Patent
Hamada et al.

(10) Patent No.: US 8,913,875 B2
(45) Date of Patent: *Dec. 16, 2014

(54) INFORMATION PROCESSING APPARATUS, INFORMATION RECORDING MEDIUM, INFORMATION PROCESSING METHOD, AND PROGRAM

(75) Inventors: Toshiya Hamada, Saitama (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 359 days.

This patent is subject to a terminal disclaimer.

(21) Appl. No.: 13/260,938

(22) PCT Filed: Apr. 6, 2010

(86) PCT No.: PCT/JP2010/056199
§ 371 (c)(1),
(2), (4) Date: Sep. 29, 2011

(87) PCT Pub. No.: WO2010/116985
PCT Pub. Date: Oct. 14, 2010

(65) Prior Publication Data
US 2012/0020645 A1 Jan. 26, 2012

(30) Foreign Application Priority Data
Apr. 8, 2009 (JP) .................................. 2009-093627

(51) Int. Cl.
*H04N 5/92* (2006.01)
*G11B 27/32* (2006.01)
*G11B 27/034* (2006.01)
*H04N 9/804* (2006.01)
*H04N 5/85* (2006.01)

(52) U.S. Cl.
CPC ............ *G11B 27/034* (2013.01); *G11B 27/322* (2013.01); *H04N 9/8042* (2013.01); *G11B 2220/2541* (2013.01); *H04N 5/85* (2013.01)
USPC .......................................... 386/248; 386/239

(58) Field of Classification Search
None
See application file for complete search history.

(56) References Cited

U.S. PATENT DOCUMENTS

2004/0175154 A1* 9/2004 Yoon et al. ...................... 386/96
2007/0174545 A1* 7/2007 Okada et al. ................... 711/112
2008/0075415 A1* 3/2008 Hashimoto et al. ............ 386/46
2008/0240679 A1* 10/2008 Shibutani et al. ............... 386/95

FOREIGN PATENT DOCUMENTS

JP 2000-173192 6/2000
JP 2004-080196 3/2004

(Continued)

*Primary Examiner* — William C Vaughn, Jr.
*Assistant Examiner* — Eileen Adams
(74) *Attorney, Agent, or Firm* — Sony Corporation

(57) ABSTRACT

A data recording/playback configuration whereby data compatible with a standard such as the BD standard, AVCHD standard, or the like, and data incompatible with a standard are usable together is realized. In the event that recorded data is data compatible with a standard such as the BD standard, AVCHD standard, or the like at the time of data recording processing as to a medium, the management information of the recorded data is recorded in a management information file only for data compatible with a standard, and in the event that the recorded data is data incompatible with a standard, a URI (Uniform Resource Identifier) that is file identification information to be applied to playback of recorded data is recorded in a file list. Playback processing is performed by using the management information file only for data compatible with a standard at the time of playback of data compatible with a standard, and by applying the file list at the time of playback of data incompatible with a standard.

17 Claims, 13 Drawing Sheets

(56) References Cited

FOREIGN PATENT DOCUMENTS

| | | |
|---|---|---|
| JP | 2007-058255 | 3/2007 |
| JP | 2007-179671 | 7/2007 |
| JP | 2007-243907 | 9/2007 |
| JP | 2008-005294 | 1/2008 |
| JP | 2008-005295 | 1/2008 |
| JP | 2008-546125 A | 12/2008 |

* cited by examiner

FIG. 4

| PLAYBACK DEVICE | MANAGEMENT FILE (DATABASE) ON MEDIUM | AVAILABLE MANAGEMENT INFORMATION (DATABASE) CORRESPONDING TO DATA TO BE PLAYED | PLAYBACK PROCESSING | |
|---|---|---|---|---|
| OLD-TYPE DEVICE: DEVICE NOT INTERPRETING FILE LIST (EXTENDED MANAGEMENT INFORMATION (EXTENDED DATABASE)) | ONLY EXISTING DATABASE | EXISTING DATABASE | PLAY ONLY STREAM FILE COMPATIBLE WITH EXISTING STANDARD USING EXISTING DATABASE | (1a) |
| | EXISTING DATABASE + FILE LIST (EXTENDED DB) | EXISTING DATABASE | PLAY ONLY STREAM FILE COMPATIBLE WITH EXISTING STANDARD USING EXISTING DATABASE | (1b) |
| NEW-TYPE DEVICE: DEVICE INTERPRETING FILE LIST (EXTENDED MANAGEMENT INFORMATION (EXTENDED DATABASE)) | ONLY EXISTING DATABASE | EXISTING DATABASE | PLAY ONLY STREAM FILE COMPATIBLE WITH EXISTING STANDARD USING EXISTING DATABASE | (2a) |
| | EXISTING DATABASE + FILE LIST (EXTENDED DB) | EXISTING DATABASE | PLAY ONLY STREAM FILE COMPATIBLE WITH EXISTING STANDARD USING EXISTING DATABASE | (2b) |
| | | EXTENDED DATABASE | READ IN BOTH OF EXISTIG DATABASE AND FILE LIST (EXTENDED DB), DETERMINE PLAYBACK ORDER BASED ON REGISTERED INFORMATION OF BOTH, PLAY DATA COMPATIBLE OR INCOMPATIBLE WITH EXISTING STANDARD | (2c) |

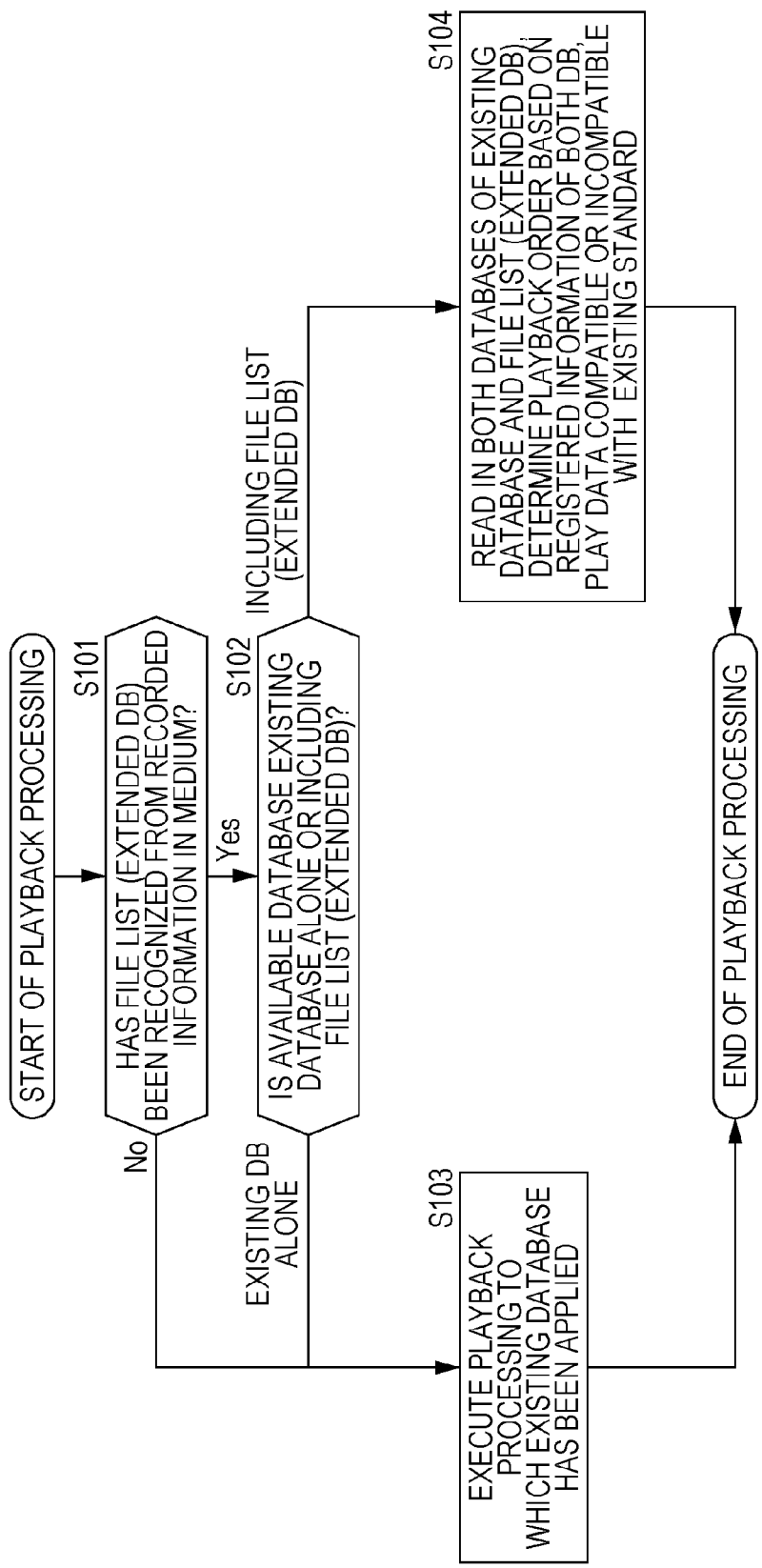

FIG. 6

| RECORDING DEVICE | MANAGEMENT FILE (DATABASE) ON MEDIUM (BEFORE RECORDING DATA) | TYPE OF DATA TO BE RECORDED | RECORDING PROCESSING | |
|---|---|---|---|---|
| OLD-TYPE DEVICE: DEVICE NOT INTERPRETING FILE LIST (EXTENDED MANAGEMENT INFORMATION (EXTENDED DATABASE)) | ONLY EXISTING DATABASE | DATA COMPATIBLE WITH EXISTING STANDARD | RECORD STREAM FILE COMPATIBLE WITH EXISTING STANDARD BY UPDATING EXISTING DATABASE | (1a) |
| | EXISTING DATABASE + FILE LIST (EXTENDED DB) | DATA COMPATIBLE WITH EXISTING STANDARD | RECORD STREAM FILE COMPATIBLE WITH EXISTING STANDARD BY UPDATING EXISTING DATABASE | (1b) |
| NEW-TYPE DEVICE: DEVICE INTERPRETING FILE LIST (EXTENDED MANAGEMENT INFORMATION (EXTENDED DATABASE)) | ONLY EXISTING DATABASE | DATA COMPATIBLE WITH EXISTING STANDARD | RECORD STREAM FILE COMPATIBLE WITH EXISTING STANDARD BY UPDATING EXISTING DATABASE | (2a) |
| | | DATA INCOMPATIBLE WITH EXISTING STANDARD | CREATE FILE LIST (EXTENDED DATABASE), AND UPDATE FILE LIST TO RECORD STREAM FILE INCOMPATIBLE WITH EXISTING STANDARD | (2b) |
| | EXISTING DATABASE + FILE LIST (EXTENDED DB) | DATA COMPATIBLE WITH EXISTING STANDARD | UPDATE EXISTING DATABASE TO RECORD STREAM FILE COMPATIBLE WITH EXISTING STANDARD | (2c) |
| | | DATA INCOMPATIBLE WITH EXISTING STANDARD | UPDATE FILE LIST (EXTENDED DATABASE) TO RECORD STREAM FILE INCOMPATIBLE WITH EXISTING STANDARD | (2d) |

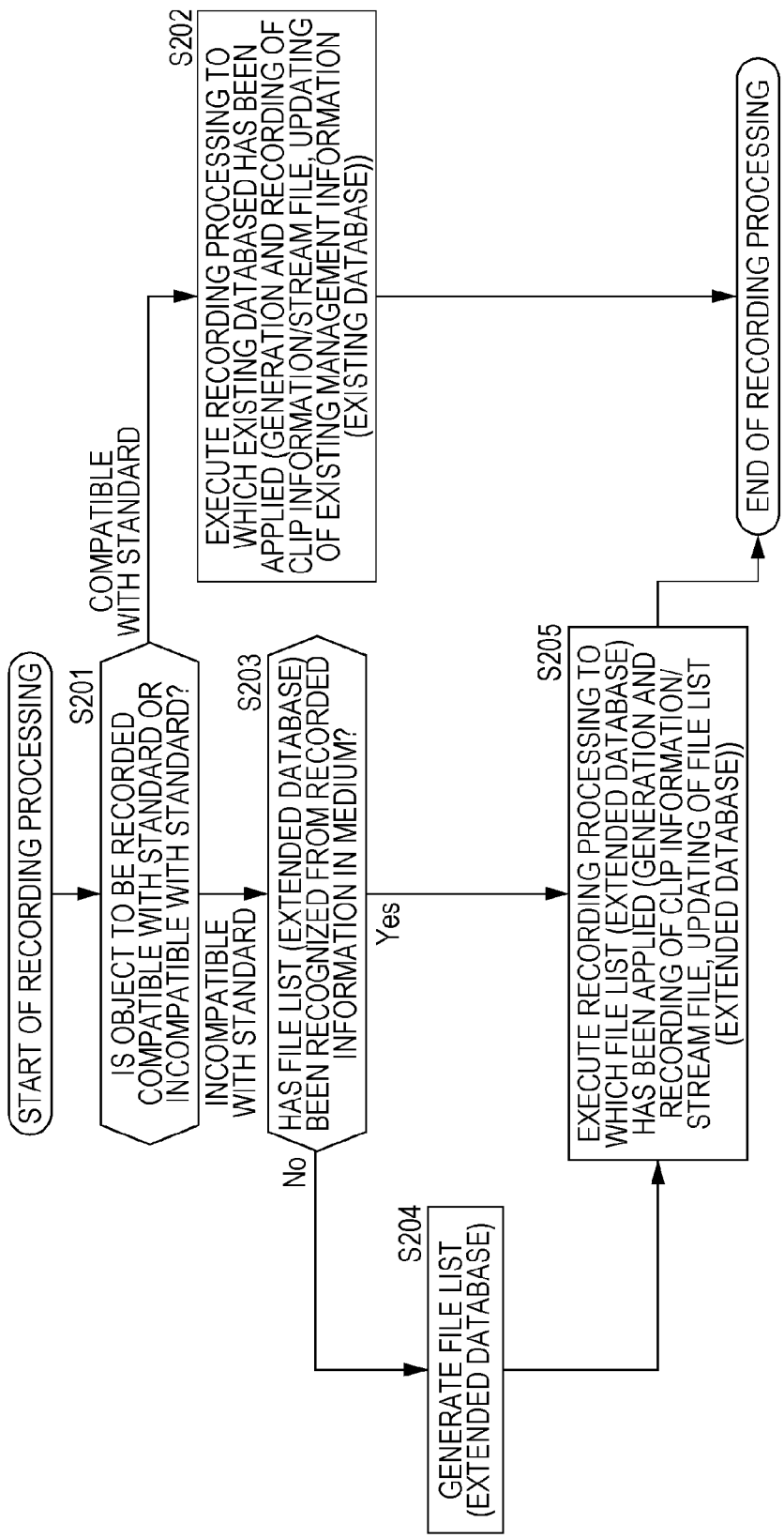

FIG. 12

350 file : BDMV/PLAYLIST/00000.mpls , non-seamless , 20081225 file : BDMV/PLAYLIST/00001.mpls , seamless , 20081230 file : BDMV/CLIPINF/10001.clpi , seamless , 20090101 file : hostA/VIDEO/100.mp4 , non-seamless , 20090115

..

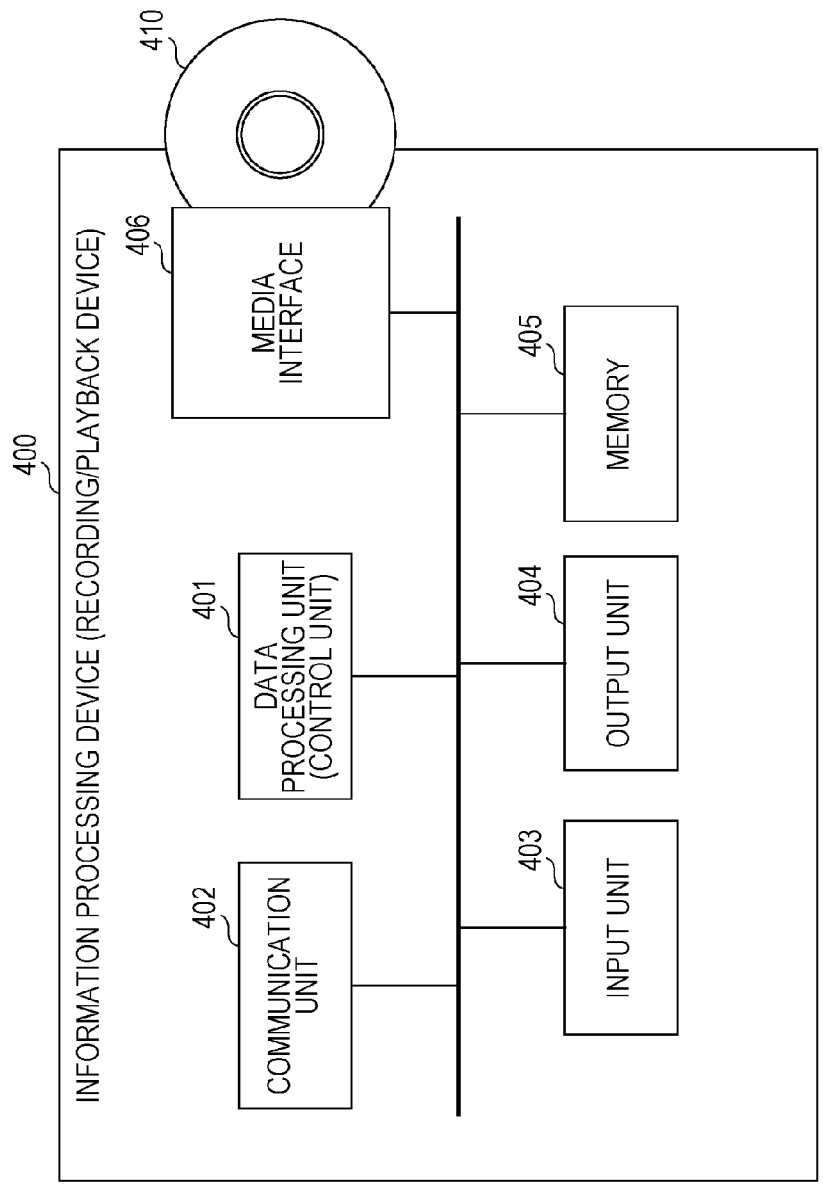

INFORMATION PROCESSING APPARATUS, INFORMATION RECORDING MEDIUM, INFORMATION PROCESSING METHOD, AND PROGRAM

CROSS REFERENCES TO RELATED APPLICATIONS

This application claims the priority benefit of U.S. national phase application no. PCT/JP2010/056199, filed Apr. 6, 2010, which claims the priority benefit of Japanese patent application number 2009-093627, filed in the Japanese Patent Office on Apr. 8, 2009, which is hereby incorporated by reference to the maximum extent allowable by law.

TECHNICAL FIELD

The present invention relates to an information processing device, an information recording medium, an information processing method, and a program. Further, in detail, the present invention relates to an information processing device, an information recording medium, an information processing method, and a program which execute data recording processing or data playback processing employing recording media such as discs, flash memory, and so forth.

BACKGROUND ART

For example, with a recording/playback device, a video camera, or the like, various media are employed, such as a hard disk, a disc-type medium such as DVD or Blu-ray Disc (registered trademark), flash memory, and so forth.

In the event of performing data recording/playback employing media, a recording/playback application to be executed at a device performs data recording/playback processing in accordance with a format stipulated beforehand. For example, examples of the standard of a recording/playback format of high-definition Hi-Vision video include the AVCHD (Advanced Video Codec High Definition) standard, and BD (Blu-ray Disc) standard. Note that examples of descriptions regarding the AVCHD standard include PTL 1 (Japanese Unexamined Patent Application Publication No. 2008-5294) and PTL 2 (Japanese Unexamined Patent Application Publication No. 2008-5295). Also, examples of descriptions regarding the BD standard include PTL 3 (Japanese Unexamined Patent Application Publication No. 2007-179671).

With the AVCHD standard and BD standard, a data format serving as an allowable object of recording processing or playback processing is stipulated. For example, in the event of performing recording/playback of an HD (High Definition) image, recording/playback of data in a predetermined format is performed, such as 1080/60i, 1080/50i, or the like. Note that [1080/60i] indicates that recording/playback of 1080 lines is performed with an HD (High Definition) image of 1920×1080 pixels as 60 field images per one second using the interlace method. [i] indicates the interlace method. Incidentally, the progressive method is indicated with [p].

The current Hi-Vision data is stipulated as an image of 1920×1080 pixels, but further, there has been developed a device which performs recording and playback of an image of around 4000×2000 pixels (=4K×2K) as a high-definition image. Also, development of various devices has been performed, such as a device which performs [1080/60p] for performing recording/playback by the progressive method different from the above-mentioned interlace method, or a device for performing recording/playback of an image for the right eye and an image for the left eye for a 3D image that is a three-dimensional stereoscopic image.

However, with the AVCHD standard and BD standard, a 4K×2K image, 1080/60p, and 3D image data are not allowed as recording/playback data. Accordingly, this leads to a problem wherein even if a 4K×2K ultra-high-definition image is generated as recorded data, data recording to which the existing AVCHD standard or BD standard has been applied may not be performed.

As one solution to solve this problem, it can be conceived to define a new standard for recording various images such as a [4K×2K] image, [1080/60p], [3D] imager, and further [1080/60i] that is the current high-definition image, and so forth. However, in the event that such a new standard has been defined, this causes a problem wherein an existing device which performs data recording and playback in accordance with the existing AVCHD standard or BD standard may not be used.

CITATION LIST

Patent Literature

PTL 1: Japanese Unexamined Patent Application Publication No. 2008-5294
PTL 2: Japanese Unexamined Patent Application Publication No. 2008-5295
PTL 3: Japanese Unexamined Patent Application Publication No. 2007-179671

SUMMARY OF INVENTION

Technical Problem

The present invention has been made in light of the above-mentioned situation, and its object is to provide an information processing device, an information recording medium, an information processing method, and a program which enable both of data compatible with a standard conforming to the existing AVCHD standard or BD standard, and data incompatible with a standard not conforming to the AVCHD standard or BD standard to be recorded, and also enables at least data compatible with a standard to be handled at an existing device which performs data recording/playback in accordance with the AVCHD standard or BD standard.

Solution to Problem

A first aspect of the present invention is an information processing device including: a data processing unit configured to perform generation or updating processing of a file list in which management information relating to recorded data is recorded, at the time of data recording processing as to a medium; with the data processing unit performing processing to record management relating to the recorded data in a management information file only for data compatible with a standard, in the event that the recorded data is data compatible with a standard conforming to a predetermined stipulated data recording/playback format, and to record the identification information of a file to be applied to playback of the recorded data in the file list, in the event that the recorded data is data incompatible with a standard not conforming to a predetermined stipulated data recording/playback format.

Further, with an embodiment of the information processing device according to the present invention, the data processing unit records an URI (Uniform Resource Identifier) that is the identification information of a file to be applied to playback of the recorded data in said file list.

Further, with an embodiment of the information processing device according to the present invention, the data processing unit executes file list updating processing for additionally recording the management information of data included in the management information file only for data compatible with a standard, and not included in the file list, in the file list.

Further, with an embodiment of the information processing device according to the present invention, the data processing unit performs processing for updating the file list to a configuration including a URI whereby all of the data files in which data for playback recorded in a medium is stored can be accessed.

Further, with an embodiment of the information processing device according to the present invention, the data processing unit further records at least either seamless playback propriety information or recorded date information relating to the recorded data in the file list.

Further, with an embodiment of the information processing device according to the present invention, the standard of the predetermined data recording/playback format is either the BD standard or AVCHD standard; with the data processing unit performing processing to generate or update an index file, a movie object file, and further a playlist file as management information files for data compatible with a standard, in the event that the recorded data is data compatible with a standard conforming to the BD standard or AVCHD standard, and to record the identification information of a file to be applied to playback of the data incompatible with a standard in the file list, in the event that the recorded data is data incompatible with a standard not conforming to the BD standard or AVCHD standard.

Further, a second aspect of the present invention is a data processing unit configured to perform data playback processing from a medium; with the data processing unit executing playback processing by applying a management information file only for data compatible with a standard to obtain a data file in which the data to be played is stored, in the event that data to be played is data compatible with a standard conforming to a predetermined stipulated data recording/playback format, and executing playback processing by obtaining file identification information recorded in a file list, and obtaining a data file in which data to be played is stored, or a file to be applied to playback of this data file using this file identification information, in the event that data to be played is data incompatible with a standard not conforming to a predetermined stipulated data recording/playback format.

Further, with an embodiment of the information processing device according to the present invention, the data processing unit executes playback processing by obtaining a URI (Uniform Resource Identifier) that is the identification information of a file from said file list, and obtaining a data file in which data to be played is stored, or a file to be applied to playback of this data file using the URI.

Further, with an embodiment of the information processing device according to the present invention, the data processing unit executes file list updating processing for additionally recording in the file list the management information of data included in the management information file only for data compatible with a standard, not included in the file list.

Further, with an embodiment of the information processing device according to the present invention, the data processing unit executes, in the event of performing playback processing to which the file list has been applied, verification processing regarding whether or not there is the management information of data included in the management information file only for data compatible with a standard, not included in the file list, and in the event that determination is made that there is the management information of the data, executes updating processing of the file list, and after completion of file list updating processing, performs playback processing to which the file list has been applied.

Further, a third aspect of the present invention is an information recording medium having a configuration in which there are recorded data for play serving as a playback object in an information processing device, a management information file only for data compatible with a standard in which management information only for data for play compatible with a standard conforming to a predetermined data recording/playback format is stored, and a file list that is the management information of data including data for play incompatible with a standard not conforming to the predetermined data recording/playback format, and enabling playback processing of the data for play by an information processing device selectively applying the file list or the management information file only for data compatible with a standard.

Further, with an embodiment of the information processing device according to the present invention, the file list is a list in which a URI (Uniform Resource Identifier) that is the identification information of a file to be applied to playback processing of the data for playback is recorded; with the information processing device enabling playback processing to be executed by obtaining an URI from the file list, and obtaining a data file in which data for play is stored, or a file to be applied to playback of this data file using the URI.

Further, a fourth aspect of the present invention is an information processing method that is executed at an information processing device, including: a data processing step for a data processing unit performing generation or updating processing of a file list in which management information relating to recorded data is recorded, at the time of data recording processing as to a medium; with the data processing step including the steps of recording management information relating to the recorded data in a management information file only for data compatible with a standard, in the event that the recorded data is data compatible with a standard conforming to a predetermined stipulated data recording/playback format, and recording the identification information of a file to be applied to playback of the recorded data in the file list, in the event that the recorded data is data incompatible with a standard not conforming to a predetermined stipulated data recording/playback format.

Further, a fifth aspect of the present invention is an information processing method that is executed at an information processing device, including: a data processing step for a data processing unit performing playback processing of data from a medium; with the data processing step including the steps of executing playback processing by applying a management information file only for data compatible with a standard to obtain a data file in which the data to be played is stored, in the event that data to be played is data compatible with a standard conforming to a predetermined stipulated data recording/playback format, and executing playback processing by obtaining file identification information recorded in a file list, and obtaining a data file in which data to be played is stored, or a file to be applied to playback of this data file using this file identification information, in the event that data to be played is data incompatible with a standard not conforming to a predetermined stipulated data recording/playback format.

Further, a sixth aspect of the present invention is a program causing an information processing device to execute information processing, including: a data processing step causing a data processing unit to perform generation or updating processing of a file list in which management information relating to recorded data is recorded, at the time of data recording processing as to a medium; with the data processing step including a step for performing processing to record management information relating to the recorded data in a management information file only for data compatible with a standard, in the event that the recorded data is data compatible with a standard conforming to a predetermined stipulated data recording/playback format, and to record the identification information of a file to be applied to playback of the recorded data in the file list, in the event that the recorded data is data incompatible with a standard not conforming to a predetermined stipulated data recording/playback format.

Further, a seventh aspect of the present invention is a program causing an information processing device to execute information processing, including: a data processing step causing a data processing unit to perform playback processing of data from a medium; with the data processing step including the steps of executing playback processing by applying a management information file only for data compatible with a standard to obtain a data file in which the data to be played is stored, in the event that data to be played is data compatible with a standard conforming to a predetermined stipulated data recording/playback format, and executing playback processing by obtaining file identification information recorded in a file list, and obtaining a data file in which data to be played is stored, or a file to be applied to playback of this data file using this file identification information, in the event that data to be played is data incompatible with a standard not conforming to a predetermined stipulated data recording/playback format.

Note that a program according to the present invention is a program which can be provided to an image processing device or computer system which can execute various program codes by a storage medium or communication medium which is provided in a computer-readable format. Such a program is provided in a computer-readable format, thereby realizing processing according to the program on the image processing device or computer system.

Further other objects, features, and advantages of the present invention will become clearer by more detailed description based on later-described embodiments of the present invention, and appended drawings. Note that, with the present specification, the term system is a logical group configuration of multiple devices, and the device of each configuration is not restricted to be included in the same casing.

Advantageous Effects of Invention

According to an embodiment of the present invention, at the time of data recording processing as to a medium, in the event that recorded data is data compatible with a standard such as the BD standard or AVCHD standard, the management information of the recorded data is recorded in an management information file only for data compatible with a standard, and in the event of data incompatible with a standard, an URI (Uniform Resource Identifier) that is file identification information to be applied to playback of the recorded data in a file list. Playback processing is performed by using the management information file only for data compatible with a standard at the time of playback of data compatible with a standard, and by applying the file list at the time of playback of data incompatible with a standard.

BRIEF DESCRIPTION OF DRAWINGS

FIG. 4 is a diagram for describing the processing mode of data playback processing according to a device and medium state.

FIG. 5 is a diagram illustrating a flowchart for describing the sequence of the data playback processing that an information processing device according to an embodiment of the present invention executes.

FIG. 6 is a diagram for describing the processing mode of data recording processing according to a device and medium state.

FIG. 7 is a diagram illustrating a flowchart for describing the sequence of the data recording processing that the information processing device according to an embodiment of the present invention executes.

FIG. 12 is a diagram for describing an example of recorded data of a file list.

FIG. 13 is a diagram for describing the configuration of the information processing device according to an embodiment of the present invention.

DESCRIPTION OF EMBODIMENTS

The details of an information processing device, an information recording medium, an information processing method, and a program according to the present invention will be described below with reference to the drawings. Description will be performed in accordance with the following items.

1. Outlines of BD Standard and AVCHD Standard
2. Recorded Data Management Configuration Example Enabling Recording/Playback of Data Compatible with Standard and Data Incompatible with Standard (First Embodiment)
3. Data Playback Processing from Media and Data Recording Processing as to Media
4. Recorded Data Management Configuration Example Enabling Recording/Playback of Data Compatible with Standard and Data Incompatible with Standard (Second Embodiment)
5. Recorded Data Management Configuration Example Enabling Recording/Playback of Data Compatible with Standard and Data Incompatible with Standard (Third Embodiment)
6. Configuration Example of Information Processing Device 1. Outlines of BD Standard and AVCHD Standard First, the outlines of the existing BD standard and AVCHD standard will be described. As described above, the BD (Blu-ray Disc) standard, and AVCHD (Advanced Video Codec High Definition) standard are both the standard of a data recording/playback format whereby high-definition Hi-Vision video is recordable for example, which has been used for the current video cameras, BD recording/playback devices, and so forth.

Figure 1:
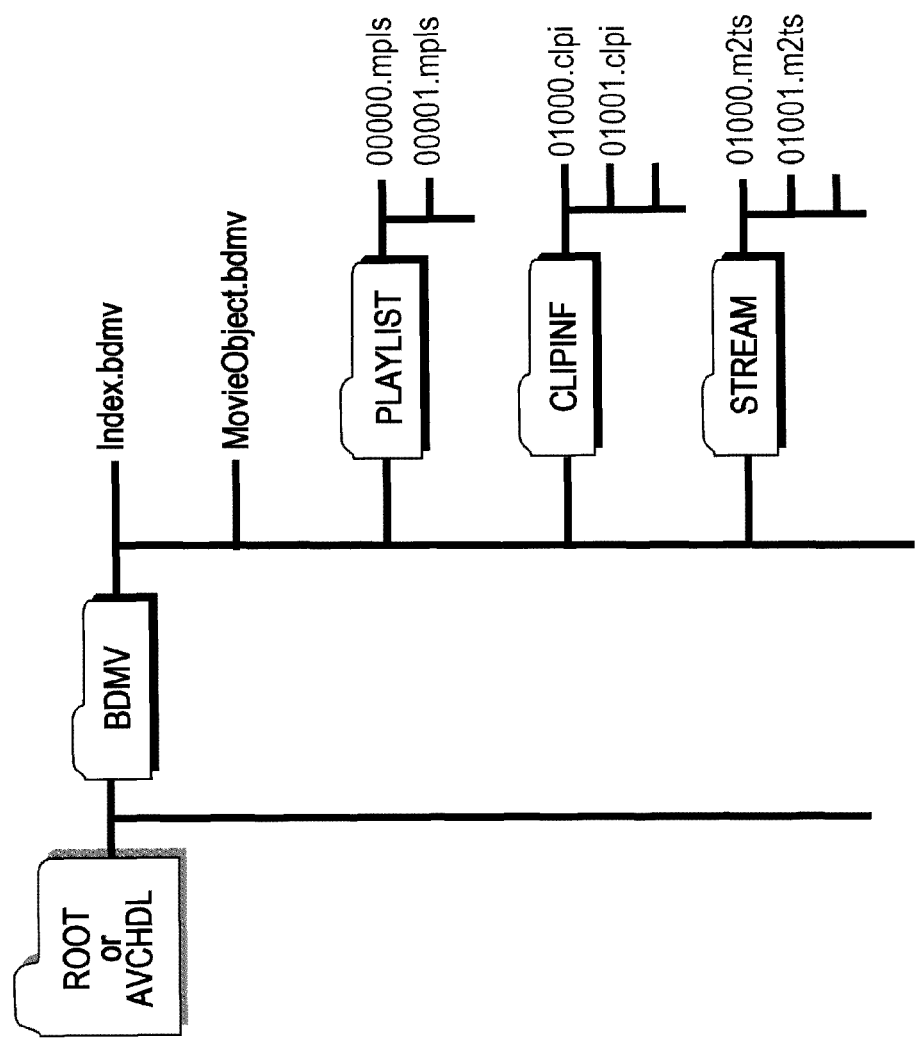
FIG. 1 is a diagram illustrating a directory configuration serving as the file management configuration of a medium (information recording medium) conforming to the BD standard and AVCHD standard.

FIG. 1 is a diagram illustrating the management configuration of data to be recorded in a medium (information recording medium) in accordance with the BD standard or AVCHD standard, i.e., a directory configuration. With both of the BD standard and the AVCHD standard, in the event of recording data in a medium, for example, a moving image stream is encoded in a MPEG2-TS stream, and recorded.

At the time of data recording processing, as shown in FIG. 1, the following files are generated and recorded.
index (index),
movie object (MovieObject),
playlist (PlayList),
clip information (ClipInformation), and
clip AV stream (ClipAVStream)

Actual data made up of video and audio is stored in the clip AV stream file as an MPEG2-TS stream.

As shown FIG. 1, a directory [BDMV] is disposed beneath the root [Root] directory. An index file [index.bdmv] and a movie object file [MovieObject.bdmv] are recorded just beneath the directory [BDMV]. Further, a playlist directory [PLAYLIST], a clip information directory [CLIPINF], and a stream directory [STREAM] are set as lower directories of the BDMV directory [BDMV].

Playlist files [xxxxx.mpls] are set in the playlist directory [PLAYLIST], and clip information files [xxxxx.clpi] are set in the clip information directory [CLIPINF], and clip AV stream files [xxxxx.m2ts] are set in the stream directory [STREAM].

The index file, movie object file, and playlist files are management information files to be applied to playback of data stored in the clip AV stream file. These management information files will also be referred to as database files or databases. Hereafter, the details of the files will be described.

The index file [index.bdmv] is a management information file regarding the recorded data of the entire medium. An example of this is a management information file in which an index (correspondence information between a title and a movie object, etc.) is recorded for each title set as the units of recorded data. Note that, with the AVCHD format, the playback order of playlists to be originally managed with a movie object file is managed within the meta data of the index file. At the time of mounting an information recorded medium on a player, the index file is first read in, and the user can perform playback specification by viewing titles described in the index file.

The movie object file [MovieObject.bdmv] is a file in which the management information of playlists is stored. Reference information as to the movie object is recorded in the index file. However, with the AVCHD format, a relation between a playlist and a title is managed by the meta data of the index file without referencing the movie object file.

Playlist files [xxxxx.mpls] to be recorded in the playlist directory [PLAYLIST] are provided corresponding to titles to be shown as to the user, and are a playback list made up of one or more play items. The play items are playback section specification information having a playback start point (IN point) and a playback end point (OUT point) as to a clip. Multiple play items within a playlist are arrayed on the temporal axis, whereby the playback order of each of the playback sections can be specified.

A clip information file [xxxxx.clpi] to be recorded in the clip information directory [CLIPINF] is set so as to correspond to a clip AV stream file [xxxxx.m2ts] to be recorded in the stream directory [STREAM]. The clip information files are files in which information relating to a stream necessary for playing an actual stream is described.

A clip AV stream file [xxxxx.m2ts] to be recorded in the stream directory [STREAM] is a file in which a stream recorded in a MPEG2-TS format is stored. Image data is stored in this file.

In this way, with the BD standard and AVCHD standard, as shown in FIG. 1, the files of an index file, a move object file, a playlist file, a clip information file, and a clip AV stream file are recorded in the BDMV directory.

Note that description will be made below by generically naming a file in which data to be played is stored such as a clip AV stream file a stream file in a simplified manner. Also, an index file, a movie object file, and a playlist file, these files are generically named as management information or database.

2. Recorded Data Management Configuration Example Enabling Recording/Playback of Data Compatible with Standard and Data Incompatible with Standard (First Embodiment)

As described with reference to FIG. 1, in the event of performing data recording in accordance with the BD standard or AVCHD standard, the files of an index file, a move object file, a playlist file, a clip information file, and a clip AV stream file are recorded in the BDMV directory.

However, as described above, with the BD standard and AVCHD standard, a 4K×2K image that is ultra-high-definition image data, 1080/60p, and 3D image data are not allowed as recording/playback data. Accordingly, even if a 4K×2K ultra-high-definition image, 1080/60p, or 3D image data is generated as recording data, it is expected that an error will occur at the time of data recording or data playback processing to which the existing AVCHD standard or BD standard has been applied.

Figure 2:
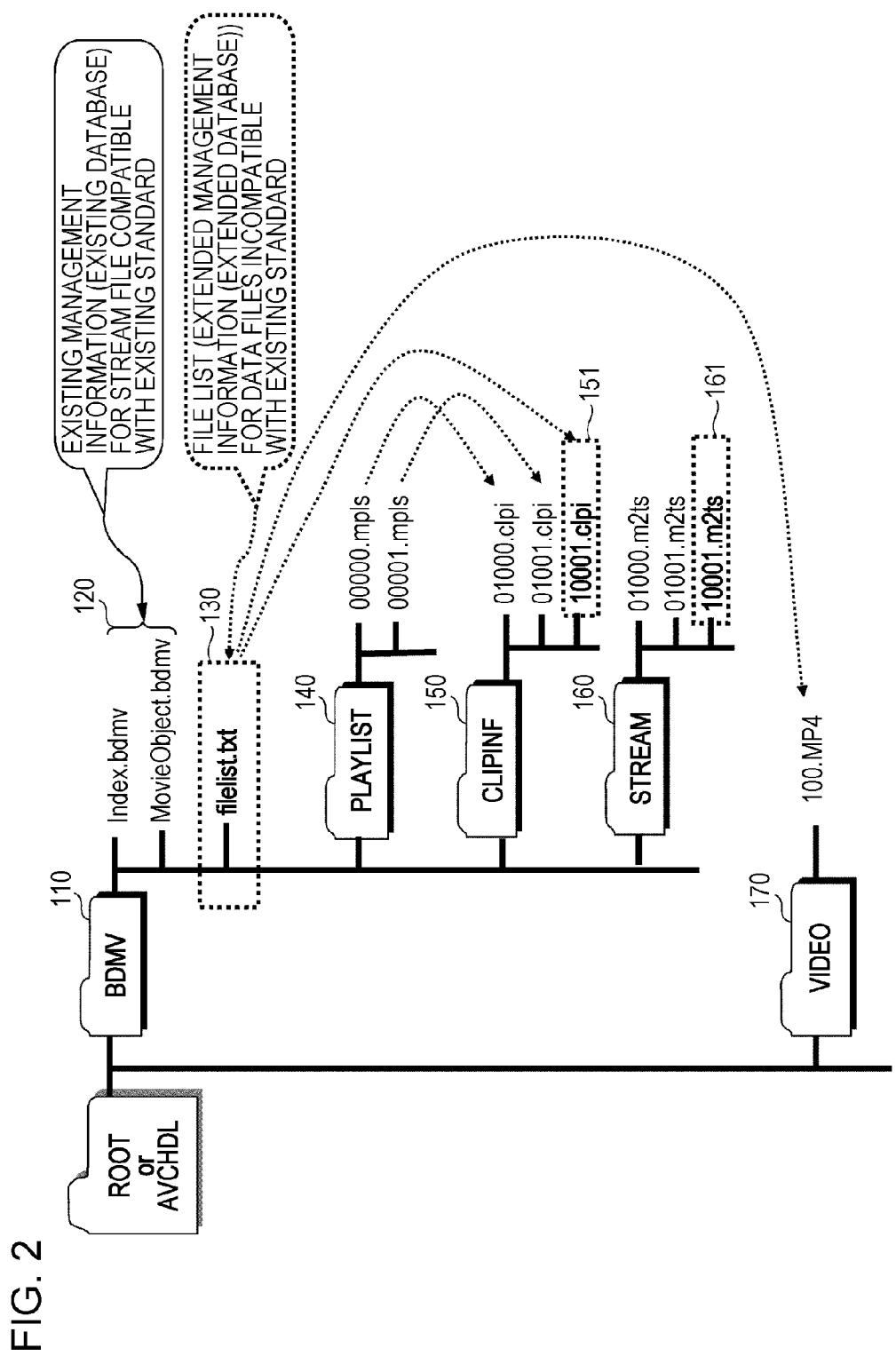
FIG. 2 is a diagram illustrating a directory configuration serving as the management configuration of recorded data for a medium according to an embodiment of the present invention.

A first embodiment that solves such a problem will be described with reference to FIG. 2 and thereafter. FIG. 2 is a diagram illustrating the management configuration of recorded data in a medium mounted on the information processing device according to the present embodiment, i.e., a directory configuration. The information processing device in accordance with an embodiment of the present invention records the files in the medium in accordance with a directory configuration as shown in FIG. 2.

The directory shown in FIG. 2 is a directory where both of data compatible with a standard allowed as recording/playback data with the BD standard and AVCHD standard, and data incompatible with a standard not allowed as recording/playback data with the BD standard and AVCHD standard may be set.

The basic configuration of the directory shown in FIG. 2 is, in the same way as described with reference to FIG. 1, the following are set beneath the BDMV directory 110.
index file [Index.bdmv],
movie object file [MovieObject.bdmv],
playlist directory [PLAYLIST],
clip information directory [CLIPINF], and
stream directory [STREAM]

Playlist files [xxxxx.mpls] are set in the playlist directory [PLAYLIST] 140, and clip information files [xxxxx.clpi] are set in the clip information directory [CLIPINF] 150, and stream files [xxxxx.m2ts] are set in the stream directory [STREAM] 160.

This basic configuration has the same configuration as the conventional BD standard or AVCHD standard. With the directory configuration shown in FIG. 2, a file list [Filelist.txt] 130 is further set beneath the BDMV directory 110.

This file list 130 is, for example, a text file. With this file list 130, data not allowed in the BD standard or AVCHD standard, e.g., management information (database) corresponding to a stream file made up of 4K×2K data, 1080/60p, data for 3D image that is a three-dimensional stereoscopic image, or the like, is set.

The index file [Index.bdmv] and movie object file [MovieObject.bdmv] are existing management information (existing database) 120 only for a stream file in which data compatible with a standard allowed as data to be recorded/played in the BD standard or AVCHD standard is stored.

On the other hand, the file list [filelist.txt] 130 is management information (database) for a stream file in which data incompatible with a standard not allowed as data to be recorded/played in the BD standard or AVCHD standard is stored. Hereafter, this will be referred to as extended management information (extended database).

Note that, with the directory shown in FIG. 2, of three files set in the stream file directory [STREAM], the upper two files, i.e.,

[01000.m2ts] and
[01001.m2ts], these stream files are stream files compatible with an existing standard conforming to the existing BD standard or AVCHD standard.

On the other hand, the file shown in the lowermost tier, i.e.,

[10001.m2ts] 161, this stream file is a stream file 161 incompatible with a standard made up of, for example, 4K×2K data not allowed with the BD standard and AVCHD standard.

Also, of three clip information files set in the clip information directory [CLIPINF], the upper two files, i.e.,

[01000.clpi] and
[01001.clpi], these clip information files are clip information files corresponding to [01000.m2ts] and [01001.m2ts] that are stream files compatible with an existing standard conforming to the existing BD standard or AVCHD standard.

On the other hand, the clip information file shown in the lowermost tier, i.e.,

[10001.clpi] 151, this clip information file is a clip information file 151 corresponds to the stream file [10001.m2ts] 161 made up of, for example, 4K×2K data not allowed with the BD standard and AVCHD standard.

The index file [Index.bdmv] and movie object file [MovieObject.bdmv] making up existing management information (existing database) 120 are existing management information (existing database) 120 only for a stream file in which data compatible with a standard allowed as data to be recorded/played in the BD standard or AVCHD standard is stored. For example, a playlist file [xxxxx.mpls] of the playlist directory 140 is selected by a title that the user can specify, set to the index file [Index.bdmv], and a clip file [xxxxx.clpi] is selected in accordance with the clip information file specification information recorded in the selected playlist file. Further, a stream file [xxxxx.m2ts] is selected according to the selected clip file [xxxxx.clpi], and image data or the like stored in the stream file is played.

This processing is executed as processing in accordance with the existing BD standard or AVCHD standard. That is to say, this processing is processing that can be executed at an existing recording/playback device.

Dotted arrows connecting a playlist file shown in FIG. 2 and a clip information file are arrows indicating correspondence between each playlist file, and a clip information file serving as a reference destination recorded in the playlist file thereof. For example, the identifier of a clip information file is recorded in a playlist file, a particular clip information file is selected according to this identifier, and playback of a stream file set so as to correspond to the selected clip information file can be performed.

With the index file [Index.bdmv] and movie object file [MovieObject.bdmv] making up the existing management information (existing database) 120 shown in FIG. 2, management information relating to data incompatible with a standard not allowed as data to be recorded/played in the BD standard or AVCHD standard is not registered.

With the file list [filelist.txt] 130 alone, the management information of data incompatible with a standard not allowed as data to be recorded/played in the BD standard or AVCHD standard is recorded. In the event of performing playback of data incompatible with a standard, e.g., the stream file 10001.m2ts] 161 shown in FIG. 2, or a stream file [100.MP4] that is MPEG-4 data set to the video directory 170, playback using the file list 130 is performed.

Figure 3:
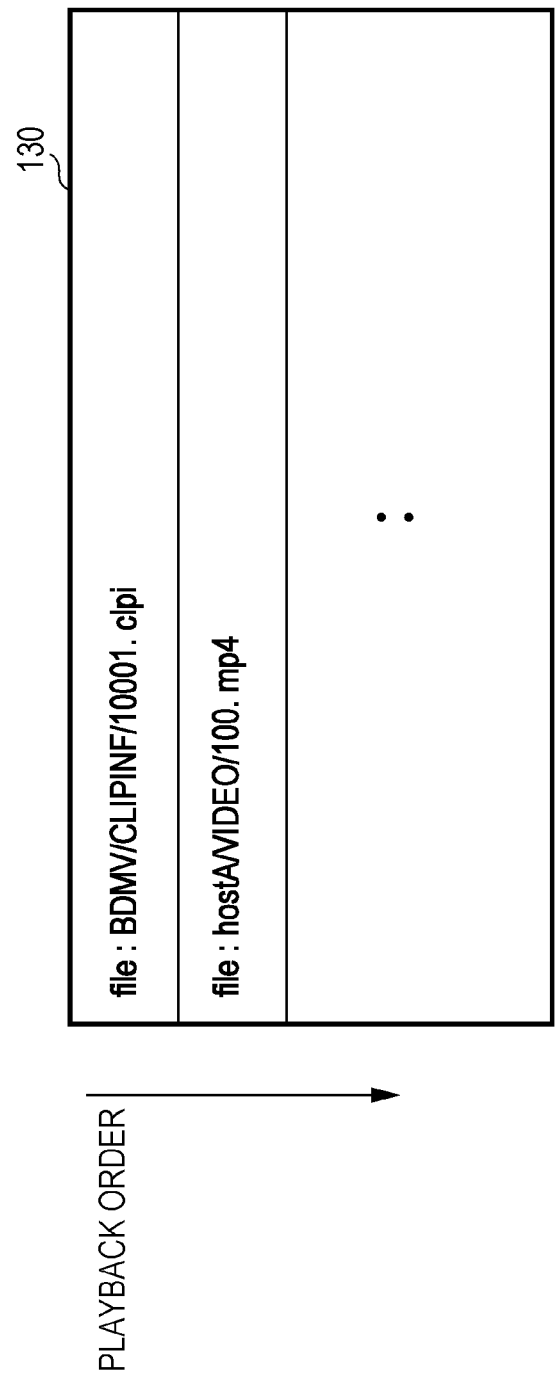
FIG. 3 is a diagram for describing an example of recorded data of a file list.

A configuration example of the file list 130 is shown in FIG. 3. The file list 130 is a list in which a clip information file serving as a reference destination, or a URI (Uniform Resource Identifier) serving as the identification information of a stream file or data file in which data to be played is stored, as shown in FIG. 3.

The URI is resource identification information stipulated by W3C (RFC3986), a clip information file or stream file serving as the reference destination can be determined by the URI.

Specifically, the first entry of the file list 130 shown in FIG. 3, i.e.,

URI=file:/BDMV/CLPINF/10001.clpi, this URI is a URI serving as the identification information of the clip information file [10001.clpi] indicated by the arrow from the file list 130 shown in FIG. 2.

Also, the second entry of the file list 130 shown in FIG. 3, i.e.,

URI=file:hostA/VIDEO/100.mp4, this URI is a URI serving as the identification information of MPEG4 data [100.MP4] set to the video directory [VIDEO] 170 indicated by the arrow from the file list 130 shown in FIG. 2.

Note that the URI is set to the file list, whereby a data file stored in another device which can be accessed via a network can also be set as a reference destination file, for example.

In the event of performing playback of data using the file list 130 shown in FIG. 3, the playback order is set to the order of URIs set to the file list. However, the playback order may be set by processing for the user optionally setting, random setting, or the like. A playback device applies an application for reading in the file list and causing the user to determine the processing, whereby various settings can be performed.

In this way, the file list 130 shown in FIG. 2 serves rolls as management information (database) corresponding to data incompatible with a standard, and a playlist. A data file such as a clip information file, or a stream file in which data to be played is stored, or the like is selected by the URI set in the file list 130, and thus, playback processing can be performed.

With the directory configuration shown in FIG. 2, management information corresponding to data compatible with a standard conforming to either the BD standard or the AVCHD standard is recorded in the existing management information (database) 120 and the playlist.

The management information corresponding to data incompatible with a standard not conforming to neither the BD standard nor the AVCHD standard is recorded in the file list 130 (extended management information (extended database)).

According to such a setting, a device which performs data playback processing conforming to at least the existing BD standard or AVCHD standard can perform data recording/playback by processing conforming to the existing BD standard or AVCHD standard using the existing management information (existing database) 120 regarding the stream files [01000.m2ts] and [01001.m2ts] compatible with an existing standard.

With a new-type device configured to enable recording of data incompatible with the BD standard or AVCHD standard, in the event of executing recording of data, determination is made whether recorded data is data compatible with a standard conforming to the BD standard or AVCHD standard, or data incompatible with a standard. In the event of data compatible with a standard, recording of data is performed by processing in accordance with the existing BD standard or AVCHD standard using the existing management information (existing database) 120. On the other hand, in the event of data incompatible with a standard, a URI serving as management information is registered in the file list 130 without using the existing management information (existing database) 120, and a stream file in which recorded data is stored, or a clip information file or the like is generated and recorded.

Note that only the MPEG2-TS data is recorded in the stream directory beneath the BDMV directory 110, and other MPEG4 data and so forth are set to the video directory 170.

Note that the first entry of the file list shown in FIG. 3 is a URI corresponding to the clip information file [10001.clpi] 151 shown in FIG. 2, and in the event of performing playback using the file list, this clip information file 151 is obtained, the stream file [10001.m2ts] determined by this clip information file 151 is read out, and playback processing is performed.

In this way, in the event that the URI of a clip information file is set to the file list, according to the clip information file obtained by the URI, the stream file corresponding to the clip information file thereof is read out and played.

The second entry of the file list shown in FIG. 3 is the URI of the MPEG4 file [100.MP4] set to the video [VIDEO] directory 130, and in this case, playback processing of the MPEG4 file [100.MP4] is performed without using a clip information file.

A device which can recognize and interpret the file list 130 is a new-type information recording device or information playback device in which a program that can interpret the file list 130 is loaded. An old-type device, i.e., a device which performs recording or playback of data in accordance with only the existing BD standard or AVCHD standard cannot interpret the file list 130.

Accordingly, even if the file list 130 is set as shown in FIG. 2, the processing will be performed assuming that there is no file list 130.

That is to say, the old-type device interprets the BDMV directory 110, and uses the existing management information (existing database) 120 set to the BDMV directory 110, whereby only a stream file compatible with the existing BD standard or AVCHD standard can be played.

A new-type information recording device or information playback device in which a program that can recognize and interpret the file list 130 is loaded can recognize and interpret the entire directory shown in FIG. 2. For example, at the time of playback of data, processing using a URI set to the file list 130 may be performed, and data compatible with a standard conforming to the BD standard or AVCHD standard may also be played using the existing management information (existing database) 120 set to the BDMV directory 110.

Playback of data incompatible with an existing standard not conforming to the existing BD standard or AVCHD standard may be performed by using the file list (extended management information (extended database)) 130, and further, playback of a stream file compatible with an existing standard conforming to the existing BD standard or AVCHD standard may also be performed.

3. Data Playback Processing from Media and Data Recording Processing as to Media Next, description will be made regarding data playback processing from a medium such as a disc in which data recording has been performed in accordance with data management configuration described with reference to FIG. 2, i.e., directory configuration, and data recording processing sequence as to a medium.

Note that in the event that the recording/playback device is the old-type device, i.e., a device which cannot interpret the file list (extended management information (extended database)) 130 shown in FIG. 2, when performing new data recording, the recording/playback device performs only processing as to the existing management information (existing database) 120. Accordingly, in the event that a device which first performed data recording as to a medium is the old-type device, the file list 130 shown in FIG. 2 is not generated.

Accordingly, processing by the old-type device which cannot interpret the file list 130, and processing by the new-type device which can interpret the file list 130 differ. Also, there may be a case where the file list 130 shown in FIG. 2 has already been set to a recording medium, or has not already been set thereto, processing that the device executes differs according to such a medium state.

FIG. 4 illustrates a table where the processing modes of data playback processing according to device and medium states are summarized. As shown in FIG. 4, playback processing of data recorded in a medium becomes the following processing modes.

(1a) In the case that the old-type device which cannot interpret the file lists (extended management information (extended databases)) performs data playback from a medium in which an existing database alone has been set (1b) In the case that the old-type device which cannot interpret the file lists (extended management information (extended databases)) performs data playback from a medium in which an existing database and a file list have been set In these cases, the old-type device can execute only playback processing employing the existing database of the BDMV directory. The old-type device performs playback processing employing the existing database of the BDMV directory set to the medium, i.e., the index file, movie object file, and a playlist.

The old-type device uses information recorded in a playlist within the existing database to read out a clip information file and a stream file in the same BDMV directory, and performs playback processing.

(2a) In the case that the new-type device which can interpret the file lists (extended management information (extended databases)) performs data playback from a medium in which an existing database alone has been set (2b) In the case that the new-type device which can interpret the file lists (extended management information (extended databases)) performs data playback from a medium in which an existing database and a file list (extended DB)

have been set, and in the event that the data to be played is data that cannot be played using the existing database (in the event of playing a stream file compatible with an existing standard (BD standard/AVCHD standard)), In these cases, the new-type device executes playback processing using the existing database in the BDMV directory. That is to say, there is no need to use a file list (extended DB).

(2c) In the case that the new-type device which can interpret the file lists (extended management information (extended databases)) performs data playback from a medium in which an existing database and a file list have been set, and in the event that the data to be played is not only data that can be played using the existing database (in the event of playing a stream file incompatible with an existing standard (BD standard/AVCHD standard))

In this case, the new-type device executes playback processing using both databases of a file list (extended DB) and an existing database.

Note that the above-mentioned processing in (2b) is exceptional processing, and in the event of performing data playback from a medium in which an existing database and a file list (extended DB) have been set, the above-mentioned processing in (2c) is basically performed. However, in the event that the user possessing the new-type device intends to test how the medium of the existing database+the file list is played at the old-type device, or particularly intends to test how to view at the old-type device, or the like, (2b) may be executed as exceptional operation.

The processing sequence in the event of performing playback processing of recorded data in a medium will be described with reference to the flowchart shown in FIG. 5. The processing shown in this flow is executed at the data processing unit of the recording/playback device. Note that this flowchart is shown as a flowchart including both processes of the new-type device and old-type device.

In step S101, the data processing unit of the recording/playback device reads the recorded information of a medium mounted on the device, and determines whether or not a file list (extended management information (extended database)) has been recognized. In the event that the playback device is the old-type device, recognition of a file list (extended DB) cannot be performed, and accordingly, this determination in step S101 becomes all No. Also, even if the playback device is the new-type device, in the event that no file list has been generated in the medium, the determination in step S101 becomes No.

In the event that the determination in step S101 is No, the processing proceeds to step S103, the data processing unit executes playback processing using an existing database. Specifically, the data processing unit uses the index file, movie object file, and further a playlist in an existing database, uses information recorded in the playlist corresponding to the title set to the index file to read out a clip information file and a stream file of the BDMV directory, and performs playback processing.

In the event that the playback device is the new-type device, and a file list (extended DB) has been generated in the medium, the determination in step S101 becomes Yes. In this case, the data processing unit executes the processing in step S102 and thereafter. That is to say, the processing in step S102 and thereafter is processing that is executed at the new-type device alone which can interpret file lists (extended databases).

In step S102, the data processing unit selects a database used for playback processing. With this selection processing, the new-type device which can interpret the file lists (extended databases) first selects a file list (extended DB). Note that selection of a database used for playback processing may be set by the user. Alternatively, selection of a database may automatically be set according to the title specified by the user. In the event that an existing database has been taken as the available database, the processing proceeds to step S103, the data processing unit executes playback processing using the existing database.

In event that a file list (extended database) has been taken as the available database, the processing proceeds to step S104. In step S104, the data processing unit reads both databases of an existing database and a file list (extended database), determines playback order based on the registered information of both DB, and plays data compatible with an existing standard or data incompatible with an existing standard. Note that determination of playback order is optional processing, an arrangement may be made wherein playback order set as a default before is used.

Note that, with the file list (extended database) to be applied in this playback processing, as described with reference to FIG. 3, an URI that is the identification information of a clip information file or stream file is recorded. The data processing unit of the information processing device (playback device) obtains the clip information file or stream file determined by the URI, and executes playback processing.

In this way, with the information processing device according to an embodiment of the present invention, in the event of performing data playback processing from the medium, the data processing unit executes the following processing.

In the event that the data to be played is data compatible with a standard conforming to a predetermined stipulated data recording/playback format, the data processing unit applies the existing management information (existing database) only for data compatible with a standard to obtain a data file in which the data to be played is stored, and executes playback processing.

In the event that the data to be played is data incompatible with a standard not conforming to a predetermined stipulated data recording/playback format, the data processing unit applies the file list (extended management information (extended database)) to obtain a data file in which the data to be played is stored, and executes playback processing.

Next, data recording processing as to a medium will be described.

With data recording processing as well, in the same way as with the data playback processing, different processing will be performed according to the type of a device for executing recording processing, and the data recording state of the medium. FIG. 6 shows a table where the processing modes of data recording processing according to the device and medium state are summarized. As shown in FIG. 6, the data recording processing as to the medium provides the following processing modes.

(1a) In the case that the old-type device which cannot interpret the file list (extended management information (extended databases)) performs data recording as to the medium in which an existing database alone has been set (1b) In the case that the old-type device which cannot interpret the file list (extended management information (extended databases)) performs data recording as to the medium in which an existing database and a file list (extended DB) have been set In these cases, the old-type device executes recording processing using an existing database in the BDMV directory. The old-type device generates a stream file and a clip information file according to the recorded data, and performs updating of an existing database according to the recorded data, and specifically performs updating of the index file and movie object file, and generation of a playlist.

(2a) In the case that the new-type device which can interpret the file list (extended management information (extended databases)) performs data recording as to a medium in which an existing database alone has been set, and in the event that the recorded data is data compatible with a standard (BD standard/AVCHD standard)

In this case, the new-type device executes data recording processing using an existing database in the BDMV directory. That is to say, there is no need to newly generate an extended database.

(2b) In the case that the new-type device which can interpret the file list (extended management information (extended databases)) performs data recording as to a medium in which an existing database alone has been set, and in the event that the recorded data is data incompatible with a standard (BD standard/AVCHD standard)

In this case, the new-type device does not use an existing database, creates a file list (extended database), and registers the management information of the recorded data in the created file list (extended DB).

Specifically, the new-type device generates a stream file or a clip information file according to the recorded data, and registers an URI serving as the management information as to these recorded data in the file list (extended database).

(2c) In the case that the new-type device which can interpret the file list (extended management information (extended databases)) performs data recording as to a medium in which an existing database and a file list (extended DB) have been set, and in the event that the recorded data is data compatible with a standard (BD standard/AVCHD standard)

In this case, the new-type device executes data recording processing to which an existing database has been applied. Specifically, the new-type device generates a stream file and a clip information file according to the recorded data, and registers the management information as to the recorded data in the extended database.

(2d) In the case that the new-type device which can interpret the file list (extended management information (extended databases)) performs data recording as to a medium in which an existing database and a file list (extended DB) have been set, and in the event that the recorded data is data incompatible with a standard (BD standard/AVCHD standard)

In this case, the new-type device executes data recording processing to which a file list (extended DB) has been applied. Specifically, the new-type device generates a stream file or a clip information file according to the recorded data, and registers an URI serving as the management information as to the recorded data in the file list (database DB).

The processing sequence in the event of performing data recording processing as to a medium will be described with reference to the flowchart shown in FIG. 7. The processing shown in this flow is executed by the data processing unit of the recording/playback device. Note that this flowchart is shown as a flowchart including both processes of the new-type device and old-type device.

In step S201, the data processing unit of the recording/playback device first determines whether the recorded data is data compatible with a standard (BD standard/AVCHD standard) or data incompatible with a standard. In the event that the recorded data is data compatible with a standard (BD standard/AVCHD standard), the existing database is selected as the available database, and in the event of data incompatible with a standard, the file list (extended database) is selected as the available database. Note that the device is the old-type device which cannot interpret the file lists (extended databases), the device may process only recording processing of data compatible with a standard. Also, the device is the new-type device which can interpret the file lists (extended databases), and in the event that the recorded data is data compatible with a standard (BD standard/AVCHD standard), selects the existing database as an available database, and in the event of data incompatible with a standard, selects the file list (extended database) as an available database.

In the event that the recorded data is data compatible with a standard (BD standard/AVCHD standard), use of the existing database is selected, and the processing proceeds to step S202. In step S202, data recording processing using the existing database is performed. That is to say, the data processing unit generates a stream file and a clip information file according to the recorded data, and performs updating of the existing database according to the recorded data, and specifically performs updating of the index file, and movie object file, and generation of a playlist.

Next, description will be made regarding the case where determination is made in step S201 that the recorded data is data incompatible with a standard (BD standard/AVCHD standard). In this case, processing with the file list (extended database) being taken as an available database is performed, and the processing proceeds to step S203. Note that the processing in step S203 and thereafter is processing that only the new-type device which can recognize the file lists (extended databases) executes.

In step S203, determination is made whether or not a file list (extended database) has been recognized from the recorded information of the medium. Even if the recording device is the new-type device, in the event that no file list (extended database) has not been generated in the medium, the determination in step S203 becomes No. In the event that determination in step S203 is No, in step S204 generation processing of a file list (extended database) is performed.

In the event that a file list (extended database) has been recognized from the recorded information in the medium in step S203, and in the event that generation processing of a file list (extended database) has been performed in step S204, the processing proceeds to step S205.

In step S205, the data recording processing using a file list (extended database) is performed. That is to say, a stream file and a clip information file according to the recorded data are generated, and updating of the file list (extended database) is performed according to the recorded data, and specifically, processing for registering a URI (Uniform Resource Identifier) corresponding to a reference file in the file list is performed as described with reference to FIG. 3.

In this way, with the information processing device according to an embodiment of the present invention, in the event of performing data recording as to the medium, the data processing unit generates a data file such as a stream file including data to be played, or the like, and a clip information file, and records the management information of the data file.

Further, in the event that recorded data is data compatible with a standard conforming to a predetermined stipulated data recording/playback format, the data processing unit records the management information of a stream file or the like in the existing management information (existing database) only for data compatible with a standard. Also, the recorded data is data incompatible with a standard not conforming to a predetermined stipulated data recording/playback format, the data processing unit performs processing for recording the URI of a clip information file or stream file in the file list (extended database).

4. Recorded Data Management Configuration Example Enabling Recording/Playback of Data Compatible with Standard and Data Incompatible with Standard (Second Embodiment)

With the above-mentioned first embodiment, the URI of a data file or clip information file relating to only data incompatible with a standard not allowed as data to be recorded/played in the BD standard or AVCHD standard has been taken as the registration information as to a file list (extended database).

An arrangement may be made wherein not only the management information relating to data incompatible with such a standard but alto the management information corresponding to data compatible with a standard may be registered in a file list. Specifically, an arrangement may be made wherein a URI for playing all of recorded data in a medium is set to a file list. Description will be made below regarding an embodiment wherein a file list having such a setting is used, as a second embodiment.

Figure 8:
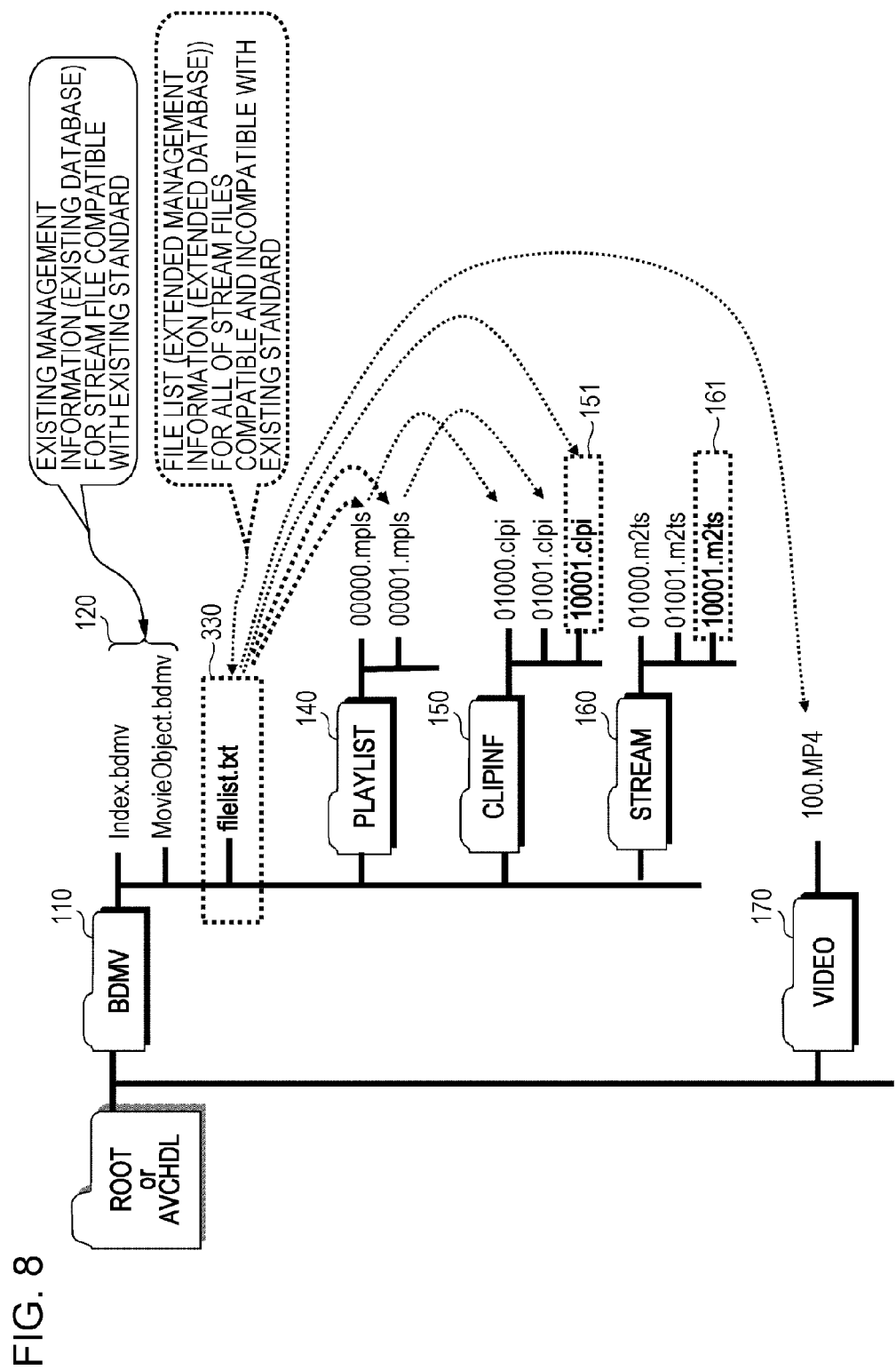
FIG. 8 is a diagram illustrating a directory configuration serving as the management configuration of recorded data of a medium according to an embodiment of the present invention.

A directory configuration according to the present embodiment will be described with reference to FIG. 8. The directory shown in FIG. 8 has the same configuration as described with reference to FIG. 2, but an URI to be registered in a file list 330 differs. With the present example, an URI to be registered in a file list is not only URI information for playing data incompatible with a standard (BD standard/AVCHD standard), but includes the URI of a playlist file to be applied to playback of data compatible with an existing standard. An arrow shown in FIG. 8 shows a file to be referenced by a registered URI of the file list.

Figure 9:
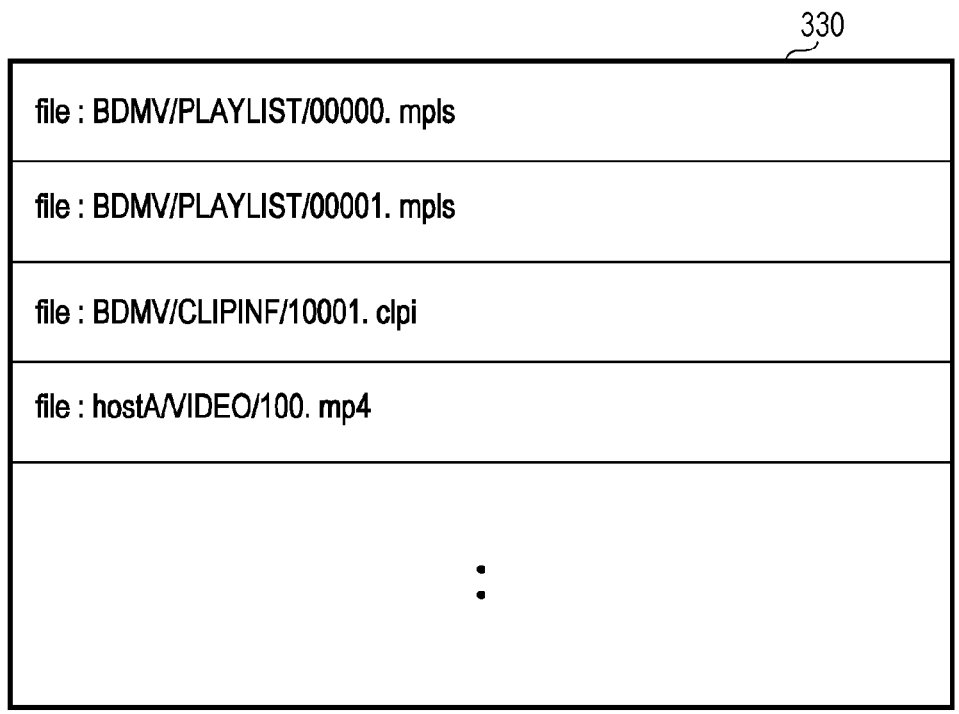
FIG. 9 is a diagram for describing an example of recorded data of a file list.

An example of the file list 330 according to the present embodiment will be shown in FIG. 9. With the file list 330 according to the present embodiment, as shown in FIG. 9, a third entry and a fourth entry are, in the same way as described with reference to FIG. 3, the URIs of a clip information file and a data file to be applied to playback of data incompatible with a standard (BD standard/AVCHD standard).

However, a first entry and a second entry are the URIs of playlist files to be applied to playback of data compatible with a standard (BD standard/AVCHD standard). These are the URIs of a playlist file [00000.mpls] and a playlist file [00001.mpls] set to the playlist directory 140 shown in FIG. 8.

The playlist file [00000.mpls] and playlist file [00001.mpls] are playlists to be applied to playback processing of data compatible with a standard. Accordingly, playback of all of data recorded in a medium can be performed by using the URIs registered in the file list 330 regardless of compatible or incompatible with a standard.

However, only the new-type device that can interpret file lists can execute registration of a URI as to this file list. In the event that the old-type device which cannot interpret file lists has executed recording of data, the old-type device registers the management information thereof in an existing database alone, but does not register in the file list.

Accordingly, in the event that data recording has been performed by the old-type device, this means that there is playable data in the media of which the URI has not been registered in the file list. Upon such a situation occurring, even if playback processing using the file list alone has been performed, data that cannot be played frequently occurs. In order to prevent such a situation, in the event that the new-type device which can interpret file lists performs data recording or playback processing, comparison processing between the registered information of existing management information (existing database), and the registered information of the file list (extended database) is performed.

In the event that existing management information (existing database) alone is registered, and there is data not registered in the file list (extended database), processing for registering a URI corresponding to unregistered data thereof in the file list (extended database) is performed. That is to say, file list updating processing for holding consistency of the databases is executed.

Figure 10:
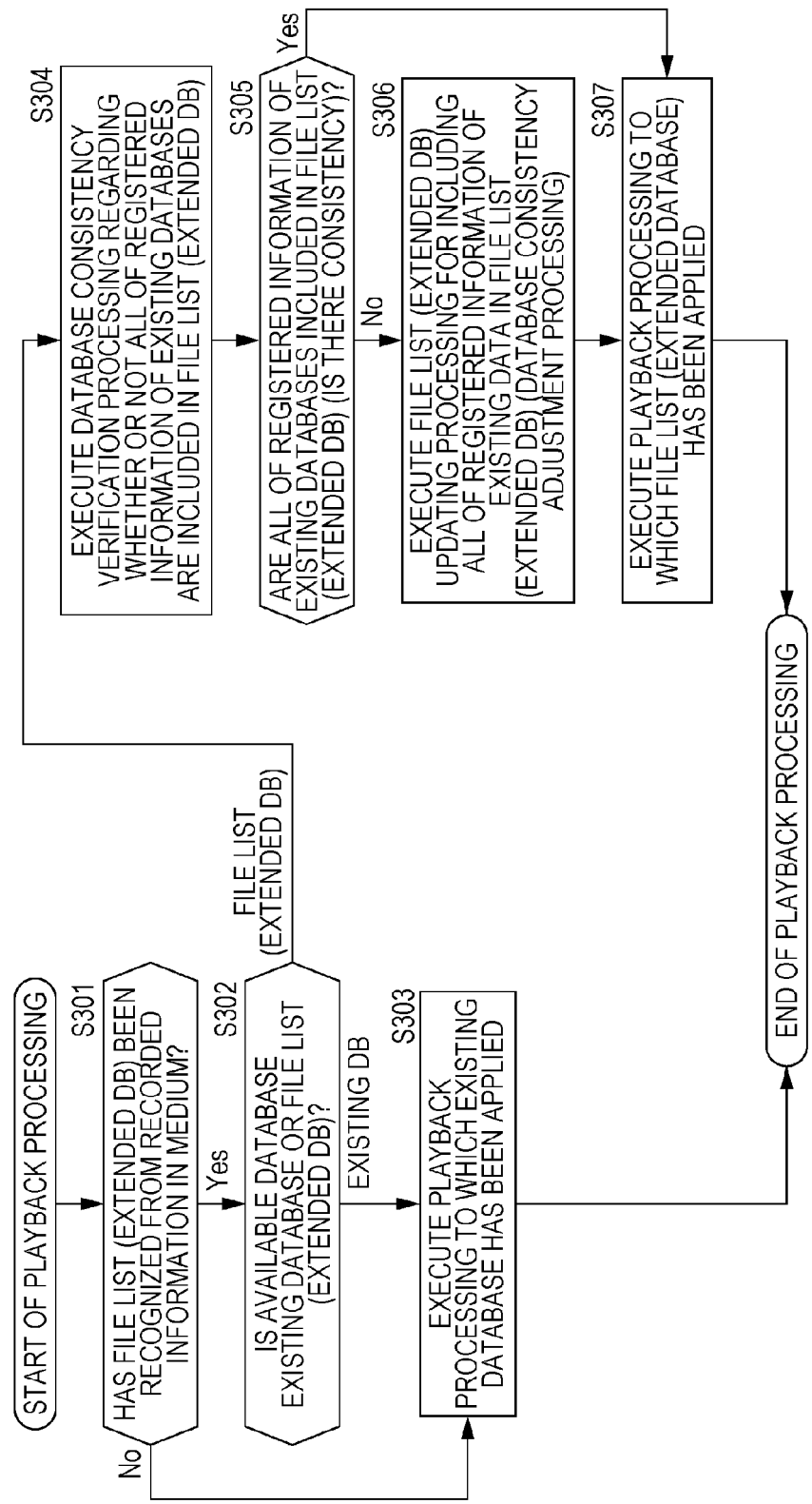
FIG. 10 is a diagram illustrating a flowchart for describing the sequence of the data playback processing that an information processing device according to an embodiment of the present invention executes.
Figure 11:
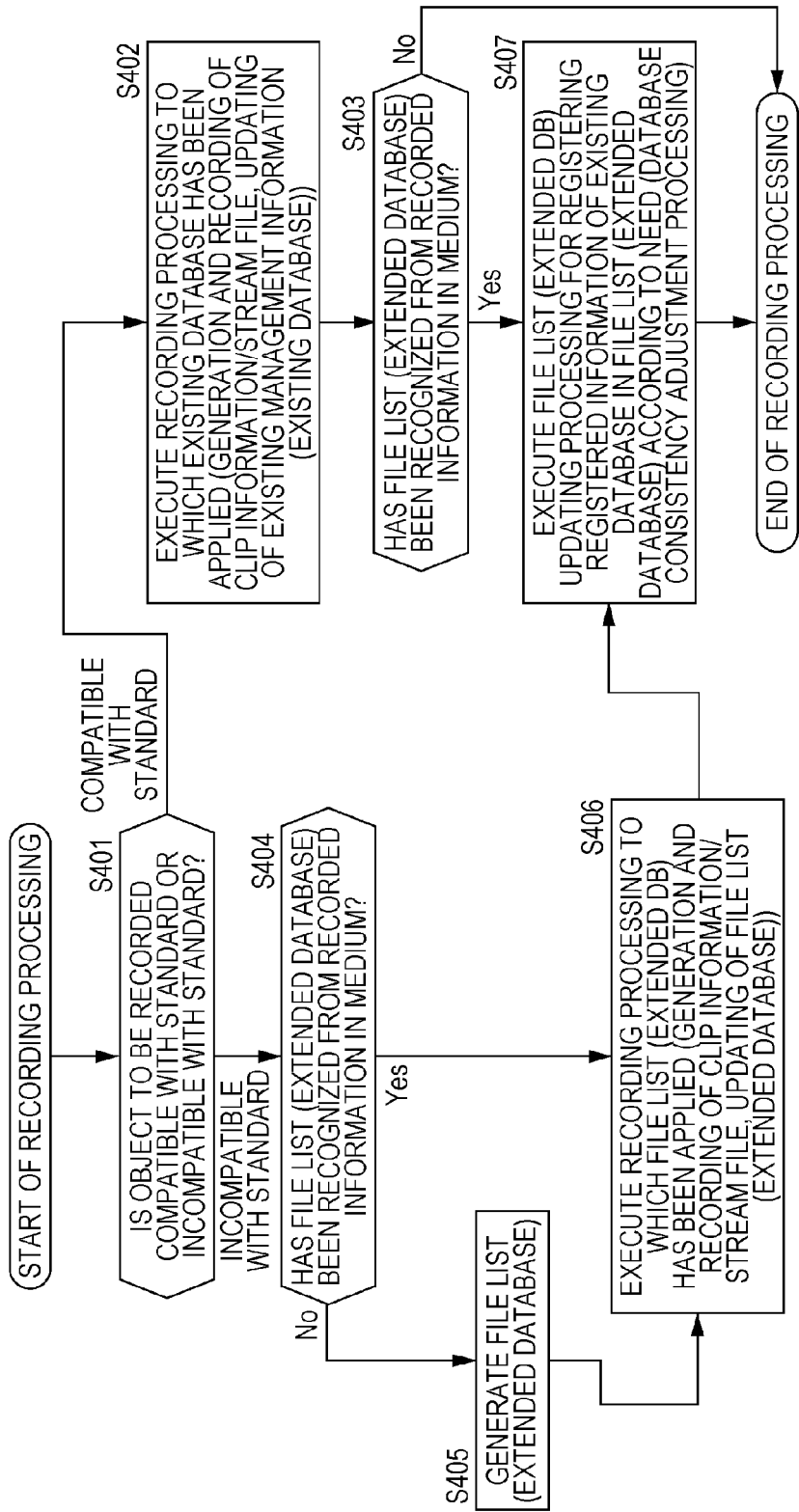
FIG. 11 is a diagram illustrating a flowchart for describing the sequence of the data recording processing that the information processing device according to an embodiment of the present invention executes.

Data playback and data recording sequence according to the present embodiment will be described with reference to the flowcharts in FIG. 10 and FIG. 11.

First, the data recording processing sequence according to the present embodiment will be described with reference to the flowchart shown in FIG. 10. The processing shown in this flow is executed by the data processing unit of the recording/playback device. Note that this flowchart is shown as a flowchart including both processes of the new-type device and old-type device.

In step S301, the data processing unit of the recording/playback device reads the recorded information of a medium mounted on the device, and determines whether or not a file list (extended management information (extended database)) has been recognized. In the event that the playback device is the old-type device, recognition of a file list (extended DB) cannot be performed, and accordingly, this determination in step S301 becomes all No. Also, even if the playback device is the new-type device, in the event that no file list has been generated in the medium, the determination in step S301 becomes No.

In the event that the determination in step S301 is No, the processing proceeds to step S303, the data processing unit executes playback processing using an existing database. Specifically, the data processing unit uses the index file, movie object file, and a playlist in an existing database, uses information recorded in the playlist corresponding to the title set to the index file, reads out a clip information file and a stream file of the BDMV directory, and performs playback processing.

In the event that the playback device is the new-type device, and a file list (extended DB) has been generated in the medium, the determination in step S301 becomes Yes. In this case, the data processing unit executes the processing in step S302 and thereafter. That is to say, the processing in step S302 and thereafter is processing that is executed at the new-type device alone which can interpret file lists (extended databases).

In step S302, the data processing unit selects a database used for playback processing. With this selection processing, the new-type device which can interpret file lists (extended DBs) first selects a file list (extended DB). That is to say, the data processing unit selects a file list (extended DB) on the premise of performing processing for including all of the registration information of an existing database in the file list (extended DB). Note that selection of a database used for playback processing may be set by the user. Alternatively, selection of a database may automatically be set according to the title specified by the user. In the event that an existing database has been taken as the available database, the processing proceeds to step S303, the data processing unit executes playback processing using the existing database.

In event that an extended database has been taken as the available database, the processing proceeds to step S304. In step S304, the data processing unit executes database consistency verification processing regarding whether or not all of the registration information of existing databases are included in the file list (extended database).

In the event that determination is not made in step S305 that all of the registration information of existing databases are included in the extended database (with consistency), the processing proceeds to step S306, and the data processing unit executes extended database updating processing (database consistency adjustment processing) for including all of the registered information of the existing databases in the file list (extended database).

For example, in the event that data recording has been performed at the old-type device, the management information corresponding to the recorded data thereof is recorded in an existing database alone. In this case, playback of a stream file compatible with an existing standard may not be performed from the file list (extended database). In order to avoid such a situation, at the time of performing playback processing using an extended database at the new-type device, updating of the file list (extended database) is executed to perform database consistency adjustment for also recording information recorded in an existing database in the file list (extended database). Note that, with this processing, the URI of a playlist corresponding to a title registered in an existing database is recorded in the file list (extended database).

Also, in the event that the new-type device is a device only for playback, the new-type device temporarily records the updated file list after the database consistency adjustment processing in memory within the device. The new-type device then starts playback using the updated file list on the memory within the device instead of the file list on the medium.

In the event that determination is made in step S305 that there is consistency of the databases, or after the consistency adjustment processing is executed in step S306, the processing proceeds to step S307, where the data processing unit performs playback processing using the file list (extended database). At this time point, at least the URIs for playing all of the medium recorded files are recorded in the file list (extended database), and playback of all of the data can be performed.

Note that, with the file list (extended database) to be applied in this playback processing, as described with reference to FIG. 9, the URI of a playlist file is recorded regarding data compatible with a standard, and a URI that is the identification information of a clip information file or stream file is recorded regarding data incompatible with a standard. The data processing unit of the information processing device (playback device) obtains a playlist file or clip information file or stream file determined by the URI, and executes playback processing.

With the present embodiment, the file list (extended database) can be set as management information including accessible information of all of the data files in which data to be played is stored, recorded in the medium.

Next, description will be made regarding the data recording processing sequence as to a medium according to the present embodiment, with reference to the flowchart shown in FIG. 11. The processing shown in this flow is executed by the data processing unit of the recording/playback device. Note that this flowchart is shown as a flowchart including both processes of the new-type device and old-type device.

In step S401, the data processing unit of the recording/playback device first determines whether the recorded data is data compatible with a standard (BD standard/AVCHD standard) or data incompatible with a standard. In the event that the recorded data is data compatible with a standard (BD standard/AVCHD standard), the existing database is selected as the available database, and in the event of data incompatible with a standard, the file list (extended database) is selected as the available database. Note that the device is the old-type device which cannot interpret the file lists (extended databases), the device may process only recording processing of data compatible with a standard. Also, the device is the new-type device which can interpret the file lists (extended databases), and in the event that the recorded data is data compatible with a standard (BD standard/AVCHD standard), selects the existing database as an available database, and in the event of data incompatible with a standard, selects the file list (extended database) as an available database.

In the event that the recorded data is data compatible with a standard (BD standard/AVCHD standard), use of the existing database is selected, and the processing proceeds to step S402. In step S402, data recording processing using the existing database is performed. That is to say, the data processing unit generates a stream file and a clip information file according to the recorded data, and performs updating of the existing database according to the recorded data, and specifically performs updating of the index file, and movie object file, and generation of a playlist.

Next, the processing proceeds to step S403. In step S403, determination is made whether or not a file list (extended database) has been recognized from the recorded information of the medium. In the event that the recording device is the old-type device, recognition of a file list (extended database) cannot be performed, and accordingly, this determination in step S403 becomes all No. Also, even if the recording device is the new-type device, in the event that no file list (extended database) has been generated in the medium, the determination in step S403 becomes No. In the event that the determination in step S403 is No, the data recording processing ends.

In the event that a file list (extended database) has been recognized from the recorded information of the medium in step S403, the processing proceeds to step S407. The processing in step S407 is processing that only the new-type device which can recognize file lists (extended databases) executes. In step S407, database consistency adjustment for registering information registered in an existing database in the file list (extended database) is performed.

This consistency adjustment processing is performed so as to prevent a stream file compatible with an existing standard from not being played from the file list (extended database).

Next, description will be made regarding the case where determination is made in step S401 that the recorded data is data incompatible with a standard (BD standard/AVCHD standard). In this case, processing with the file list (extended database) being taken as an available database is performed, and the processing proceeds to step S404. Note that the processing in step S404 and thereafter is processing that only the new-type device which can recognize the file lists (extended databases) executes.

In step S404, determination is made whether or not a file list (extended database) has been recognized from the recorded information of the medium. Even if the recording device is the new-type device, in the event that no file list (extended database) has been generated in the medium, the determination in step S404 becomes No. In the event that determination in step S404 is No, in step S405 generation processing of a file list (extended database) is performed.

In the event that a file list (extended database) has been recognized from the recorded information in the medium in step S404, and in the event that generation processing of a file list (extended database) has been performed in step S405, the processing proceeds to step S406.

In step S406, the data recording processing using a file list (extended database) is performed. That is to say, a stream file and a clip information file according to the recorded data are generated, and updating of the file list (extended database) is performed according to the recorded data, and specifically, as described with reference to FIG. 9, processing for registering the URI (Uniform Resource Identifier) corresponding to the reference file in the file list is performed.

Next, the processing proceeds to step S407. In step S407, database consistency adjustment (management information file updating processing) for registering information registered in the existing database in the file list (extended database) is also performed. Note that this processing does not have to be executed in the event that the registered information regarding all of the existing databases has been registered in the file list (extended database) (with consistency). This processing is executed only in the event that there is information registered in an existing database but not registered in the file list (extended database) (without consistency).

With the present embodiment, in the event that there is management information included the existing management information (existing database) but not included in the file list (extended database), the data processing unit of the information processing device performs management information file updating processing for additionally recording the management information thereof to the file list (extended database). According to this processing, the file list (extended database) can be set as management information including accessible information (URI) of all of the data files in which data to be played is stored, recorded in the medium.

5. Recorded Data Management Configuration Example Enabling Recording/Playback of Data Compatible with Standard and Data Incompatible with Standard (Third Embodiment)

With the above-mentioned embodiments, an arrangement has been made wherein only the URI of a file to be applied to data playback is recorded in a file list (extended database). Information other than this URI information may be recorded in the file list. Description will be made below regarding an example wherein information other than a URI has been registered in a file list, as a third embodiment.

An example of a file list 350 according to the present embodiment will be shown in FIG. 12. The file list 350 according to the present embodiment is a file list where the URI of a playlist file to be applied to playback of data compatible with a standard, and further the URI of a clip information file or stream file to be applied to playback of data incompatible with a standard are registered, in the same way as described above with reference to FIG. 9.

Further, the file list 350 has a configuration, as shown in FIG. 12, wherein
seamless playback propriety information: [non-seamless], [seamless], and
recorded date information: [20081225] and so forth, these information are recorded along with the URI of each entry.

The seamless playback propriety information is information indicating whether or not, with the playback processing of a stream file, this file can consecutively be played as to a file played immediately prior thereto. Information called seamless [seamless] is set to consecutively playable data. Information called non-seamless [non-seamless] is set to consecutively unplayable data. Note that a seamless mode may be set as identifiable information. The recorded date information is date information when data recording was executed. These information are set by the data processing unit of the recording device at the time of data recording processing. Note that an arrangement may be made wherein information other than the information shown in FIG. 12 is registered in a file list.

In the event of executing playback processing to which a file list has been applied, the data processing unit of the information processing device can realize playback processing in accordance with the registered information of a file list. For example, playback control may be performed, such as processing for arraying in recording order and playing, consecutive playback processing of seamless-connected files, or the like.

6. Configuration Example of Information Processing Device

Next, description will be made regarding a configuration example of the information processing device according to an embodiment of the present invention which executes data recording processing as to the above-mentioned medium, and data playback processing from the medium, with reference to FIG. 13. FIG. 13 is a block diagram illustrating a configuration example of an information processing device 400 according to an embodiment of the present invention. The information processing device 400 is a device which performs at least either data recording or data playback as to a medium 410. Specifically, examples of this include a recorder, a video camera, and a PC.

Note that FIG. 13 illustrates a disc-type medium as the medium 410, but the medium is not restricted to a disc-type medium, may be a medium such as flash memory or the like.

The information processing device 400 includes, as shown in FIG. 13, a data processing unit (control unit) 401, a communication unit 402, an input unit 403, an output unit 404, memory 405, and a media interface 406.

The data processing unit 401 includes a CPU having a program execution function for executing various data processing programs. The data processing unit 401 executes, for example, an application program for performing data recording/playback processing. The data processing unit 401 performs recording processing as to a medium such as broadcast data input via the communication unit 402, playback processing of data read out from a medium, or the like.

The input unit 403 is, for example, a user's operating unit to which various types of input are performed such as input of data recording or playback instruction or the like. Note that a remote controller is also included in the input unit 403, whereby input of remote controller operation information can also be performed. The output unit 404 is an output unit for images and audio made up of a display, a speaker, and so forth. The memory 405 is made up of RAM, ROM, and so forth, and is used as a storage region for an application program that the data processing unit 401 executes, and so forth. The memory 405 is also used for parameters for application, and a work region, and further used for a buffer region of medium recorded data, and so forth.

The media interface 406 is an interface to be applied to data recording and playback processing using the medium 410. In accordance with a request from the data processing unit 401, the media interface 406 writes data in the medium 410, or data readout processing from the medium 410, and so forth.

Data recording/playback processing that is executed at the data processing unit 401 is processing previously described with reference to the flowchart, for example. A program for executing such processing is stored in the memory 405.

Detailed description has been made so far regarding the present invention while referencing particular embodiments. However, it is self-evident that one skilled in the art can perform various modifications and changes without departing from the essence of the present invention. That is to say, the present invention has been disclosed exemplarity, and the description content of the present specification is not to be interpreted in a limited manner. The claims should be referred to in order to determine the essence of the present invention.

Note that "incompatible with a standard" described with the above-mentioned embodiments means incompatible with an existing conventional standard, and for example, in the event that a standard is upgraded in the future, s predetermined extended stream may become "compatible with a standard", but in such a case, the extended stream thereof is a stream incompatible with the standard as far as this extended stream is incompatible with the standard of the former version.

Also, the series of processing described in the present Specification may be executed by hardware or software or a combined configuration of both. In the event of executing processing by software, a program in which the processing sequence is recorded may be executed by being installed in memory within a computer built into in dedicated hardware, or may be executed by being installed in a general-purpose computer which can execute various types of processing. For example, the program may be recorded in a recording medium beforehand. In addition to installing in the computer from a recording medium, the program may be received via a network such as a LAN (Local Area Network) or the Internet, and installed in a recording medium such as a built-in hard disk or the like.

Note that various types of processing described in the present Specification may be executed not only in time sequence in accordance with the described sequence but also in parallel or individually according to the processing capability of a device which executes the processing or according to need. Also, with the present Specification, the term "system" means a logical group configuration of multiple devices, and is not restricted to a configuration in which component devices are included in the same casing.

INDUSTRIAL APPLICABILITY

As described above, according to the configuration of an embodiment of the present invention, at the time of data recording processing as to a medium, in the event that recorded data is data compatible with a standard such as the BD standard or AVCHD standard or the like, the management information of the recorded data is recorded in a management information file only for data compatible with a standard, and in the event of data incompatible with a standard, an URI (Uniform Resource Identifier) that is file identification information to be applied to playback of the recorded data is recorded in a file list. Playback processing is performed by using the management information file only for data compatible with a standard at the time of playback of data compatible with a standard, and by applying the file list at the time of playback of data incompatible with a standard.

REFERENCE SIGNS LIST

110 BDMV directory
120 existing management information (existing database)
130 file list (extended management information (extended database))
140 playlist directory
150 clip information directory
151 clip information file
160 stream directory
161 stream file
170 video directory
330 file list (extended management information (extended database))
350 file list (extended management information (extended database))
400 information processing device
401 data processing unit
402 communication unit
403 input unit
404 output unit
405 memory
406 media interface
410 medium

The invention claimed is:

1. An information processing device comprising:
a data processing unit configured to perform generation or updating of a file list in which management information relating to recorded data is recorded, at a time of recording data to a medium,
wherein said data processing unit performs processing to:
record the management information relating to said recorded data in a management information file when said recorded data is compatible with a standard conforming to a predetermined stipulated data recording/playback format; and
record identification information of a file to be applied to playback of said recorded data in said file list when said recorded data is incompatible with said standard conforming to said predetermined stipulated data recording/playback format,
wherein said data processing unit is configured to update said file list for additionally recording the management information not included in said file list of said recorded data incompatible with said standard.

2. The information processing device according to claim 1, wherein said data processing unit is configured to record an URI (Uniform Resource Identifier) that is said identification information of said file to be applied to playback of said recorded data in said file list.

3. The information processing device according to claim 1, wherein said data processing unit is configured to perform processing for updating said file list to a configuration including a URI (Uniform Resource Identifier) to access all data files in which said data for playback is stored.

4. The information processing device according to claim 1, wherein said data processing unit is further configured to record at least seamless playback propriety information relating to said recorded data in said file list.

5. The information processing device according to claim 1, wherein said management information file comprises an index file, a movie object file, and a playlist file.

6. The information processing device according to claim 5, wherein said index file comprises said management information regarding said recorded data of said entire medium.

7. The information processing device according to claim 5, wherein said movie object file comprises the management information of playlists.

8. The information processing device according to claim 5, wherein said playlist file comprises a playback list made up of one or more play items,
wherein each of said one or more play items comprises a playback start point and a playback end point corresponding to a clip.

9. The information processing device according to claim 1, wherein said file list is a list in which clip information serving as a reference destination in which said data to be played is stored.

10. The information processing device according to claim 1, wherein said file list is a list in which an URI (Uniform Resource Identifier) serving as said identification information of a stream file in which said data to be played is stored.

11. The information processing device according to claim 1, wherein said management information corresponding to said recorded data compatible with said standard is registered in said file list.

12. An information processing device comprising:
a data processing unit configured to perform generation or updating of a file list in which management information relating to recorded data is recorded, at a time of recording data to a medium,
wherein said data processing unit performs processing to:
record the management information relating to said recorded data in a management information file when said recorded data is compatible with a standard conforming to a predetermined stipulated data recording/playback format; and
record identification information of a file to be applied to playback of said recorded data in said file list when said recorded data is incompatible with said standard conforming to said predetermined stipulated data recording/playback format,
wherein said standard of said predetermined data recording/playback format is either a Blu-ray Disc (BD) standard or an Advanced Video Codec High Definition (AVCHD) standard,
wherein said data processing unit is configured to perform processing to:
generate or update an index file, a movie object file, and further a playlist file as management information files when said recorded data is compatible with said standard conforming to said BD standard or said AVCHD standard; and
record the identification information of said file to be applied to playback of said recorded data incompatible with said standard in said file list when said recorded data is incompatible with said standard conforming to said BD standard or said AVCHD standard.

13. A method for processing information, the method comprising:
in an information processing device:
performing generation or updating of a file list in which management information relating to recorded data is recorded, at a time of recording data to a medium,
wherein said generation or updating comprises:
recording said management information relating to said recorded data in a management information file when said recorded data is compatible with a standard conforming to a predetermined stipulated data recording/playback format; and
recording identification information of a file to be applied to playback of said recorded data in said file list when said recorded data is incompatible with said standard conforming to said predetermined stipulated data recording/playback format; and processing for updating said file list to a configuration including a URI (Uniform Resource Identifier) to access all data files in which said data for playback is stored.

14. A non-transitory computer-readable storage medium having stored thereon, a computer program having at least one code section for information processing, said at least one code section being executable by a computer for causing said computer to perform steps comprising:
performing generation or updating of a file list in which management information relating to recorded data is recorded, at a time of recording data to a medium,
wherein said generation or updating comprises:
recording said management information relating to said recorded data in a management information file when said recorded data is compatible with a standard conforming to a predetermined stipulated data recording/playback format; and
recording identification information of a file to be applied to playback of said recorded data in said file list when said recorded data is incompatible with said standard conforming to said predetermined stipulated data recording/playback format; and
recording at least seamless playback propriety information relating to said recorded data in said file list,
wherein the seamless playback propriety information indicates whether or not said recorded data is played consecutive to another file played.

15. An information processing device comprising:
a data processing unit configured to perform generation or updating of a file list in which management information relating to recorded data is recorded, at a time of recording data to a medium,
wherein said data processing unit performs processing to:
record the management information relating to said recorded data in a management information file when said recorded data is compatible with a standard conforming to a predetermined stipulated data recording/playback format;
record identification information of a file to be applied to playback of said recorded data in said file list when said recorded data is incompatible with said standard conforming to said predetermined stipulated data recording/playback format; and
record at least seamless playback propriety information relating to said recorded data in said file list,
wherein the seamless playback propriety information indicates whether or not said recorded data is played consecutive to another file played.

16. The information processing device according to claim 15, wherein said recorded data is consecutively playable when the seamless playback propriety information is set seamless.

17. The information processing device according to claim 15, wherein said recorded data is consecutively unplayable when the seamless playback propriety information is set non-seamless.

* * * * *